W. W. LOBDELL.
CASTING GROOVED PULLEYS.
No. 191,981. Patented June 12, 1877.
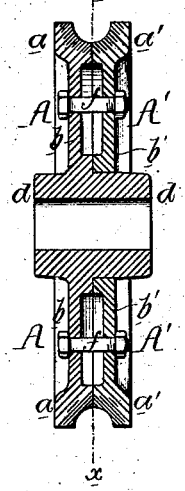
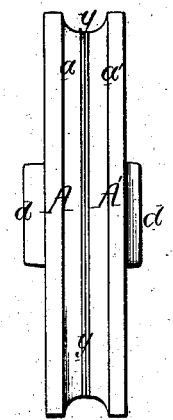
Witnesses:
Henry Howson Jr.
Harry Smith
Inventor
William W. Lobdell
by his Attorneys
Howson and Son

UNITED STATES PATENT OFFICE.

WILLIAM W. LOBDELL, OF WILMINGTON, DELAWARE.

IMPROVEMENT IN CASTING GROOVED PULLEYS.

Specification forming part of Letters Patent No. 191,981, dated June 12, 1877; application filed April 21, 1877.

*To all whom it may concern:*

Be it known that I, WILLIAM W. LOBDELL, of Wilmington, Delaware, have invented an Improvement in the Manufacture of Grooved Wheels or Pulleys, of which the following is a specification:

My invention consists of a mode of manufacturing cast-iron wheels having a groove made in two parts secured together, as more fully described hereafter.

In the accompanying drawing, Figure 1 is an edge view of a wheel made according to my invention; Fig. 2, a section of the same; and Fig. 3, a section of the mold, showing the mode of casting the wheel.

The wheel, Fig. 2, is made in two parts—namely, the part A, consisting of half the rim, a web, $b$, and the whole of the hub $d$, the other part, A', comprising the remaining half $a'$ of the rim, and a web, $b'$, fitted to the hub, the two parts of the wheel being secured together by bolts $f$, as shown in Fig. 2.

It should be understood that, although I prefer the above plan of making the wheel in two parts, it may be differently constructed. For instance, a portion of the hub may be on each half of the wheel, instead of on one-half only, or the wheel may be made in more than two parts, providing the rim is separable on the line $x\,x$, midway between opposite edges of the groove.

The part A' of the wheel is shown in the mold, Fig. 3, the concave portion, which constitutes one-half of the wheel's groove, being in contact with the chill D.

When the two parts, each cast in the manner shown in Fig. 3, are bolted together, they will constitute a single wheel with a chilled and hardened groove, which, if desired, may be turned perfectly true.

There is this advantage in my improved wheel made with a two-part rim, which has a chilled groove: When it is used for hard service, as in rolling tubes, and the groove becomes so far worn that it is useless for rolling tubes of the diameter for which it was originally intended, it may be taken apart and a plate or plates or rings of steel (shown at $y$, Fig. 1) may be introduced between the two parts prior to bolting them together, the rim being subsequently turned for rolling a tube of larger diameter than that for which it was first made.

It will be evident that my invention may be applied to wheels having grooves of different shapes.

I claim as my invention—

The within-described wheel, having a grooved rim, made in two parts, secured together and chilled at the groove only, as set forth.

In testimony whereof I have signed my name to this specification in the presence of two subscribing witnesses.

WILLIAM W. LOBDELL.

Witnesses:
JAMES H. CAMERON,
GEO. G. LOBDELL, Jr.